United States Patent [19]

Bernhard et al.

[11] Patent Number: 5,436,935
[45] Date of Patent: Jul. 25, 1995

[54] PROCESS FOR SYNCHRONIZING A RECEIVER SWITCHING CIRCUIT TO A RECEIVED SIGNAL CONTAINING A PN-CODE-SPREAD DATA SIGNAL

[75] Inventors: Urs Bernhard, Zürich; Arnold Welti, Berikon, both of Switzerland

[73] Assignee: ASCOM Tech AG., Bern, Switzerland

[21] Appl. No.: 119,546

[22] Filed: Sep. 13, 1993

[30] Foreign Application Priority Data

Sep. 29, 1992 [CH] Switzerland .................. 3040/92

[51] Int. Cl.$^6$ .................................................. H04L 7/00
[52] U.S. Cl. ..................................... 375/367; 370/107; 375/200
[58] Field of Search ............... 375/115, 1, 114, 118, 375/120, 111; 370/107; 380/34, 33

[56] References Cited

U.S. PATENT DOCUMENTS

| | | | |
|---|---|---|---|
| 4,221,005 | 9/1980 | La Flame | 375/115 |
| 4,638,494 | 1/1987 | Kartchner et al. | 375/115 |
| 5,090,023 | 2/1992 | Watanabe et al. | 375/115 |

FOREIGN PATENT DOCUMENTS

3743731 7/1989 Germany .
3743732 7/1989 Germany .

*Primary Examiner*—Stephen Chin
*Assistant Examiner*—Hai H. Phan
*Attorney, Agent, or Firm*—Brady, O'Boyle & Gates

[57] ABSTRACT

A synchronizing circuit comprises a controllable timer (9) and a PN-code generator (10) controllable thereby with at least three outputs (11.1, 11.2, 11.3), for the production of at least three PN-code signals phase-shifted with respect to one another. The PN-code signals phase-shifted with respect to one another are correlated, in parallel correlation paths, with the received signal. Upon the presence of a time drift, the phase position of the trailing PN-code signal, for example, is changed so that this signal is now leading. Thereby, the control range is shifted. At the same time, reassignment is effected between the correlation path and the demodulating output in such a way that in all cases the correlation path that is in the middle with respect to time and that has the maximum correlation power is utilized for demodulation.

8 Claims, 5 Drawing Sheets

PROCESS FOR SYNCHRONIZING A RECEIVER SWITCHING CIRCUIT TO A RECEIVED SIGNAL CONTAINING A PN-CODE-SPREAD DATA SIGNAL

FIELD OF ART

The invention relates to a process for the synchronization of a receiver switching circuit to a received signal containing a PN-code-spread data signal in which, based on a controllable timer, at least three PN-code signals shifted in time with respect to one another are generated, wherein a middle PN-code signal is correlated with the received signal for the purpose of data demodulation, and a leading and trailing PN-code signal is correlated with the received signal for the purpose of regulating the timer.

STATE OF THE ART

When using a direct-sequence method for the transmission of communication signals with the aid of the band-spreading technique, a carrier already modulated with the communication signal is additionally multiplied with a so-called PN code (PN = "pseudo-noise"). Since the bandwidth of the PN signal is much larger than that of the communication signal, a spectral expansion of the latter takes place. This results, on the receiver side, in a considerable expenditure for synchronization of the. PN code in order to undo the spectral expansion again. This is so because, for data modulation, the PN code produced locally in the receiver (receiver code) must coincide more accurately than 1 code chip (duration $T_c$) with the PN code of the received signal (transmitter code). Under practical conditions, the receiver synchronization is performed by two series-connected process stages, namely the coarse synchronization ("acquisition") and the fine synchronization ("tracking").

Such a synchronization process has been known, for example, from DE 3,743,732. For coarse synchronization, all possible relative code shifts must be tested, in principle, until the approximate chronological coincidence of the two codes can be determined by a power measurement. In order to accelerate the coarse synchronization, it has been suggested to produce the code word repeatedly in respectively several different phase positions so that, per unit time, several phase positions can be examined simultaneously. The searching procedure is finished once a correlation between the code word and the received signal is determined in at least one of the different phase positions. The subsequent fine synchronization is conducted by means of a control circuit (e.g. a delay-locked loop, DLL).

Such nonlinear control circuits have the property that they can lose synchronism under interference conditions (unmesh phenomenon). One possibility of preventing such unmeshing, or of lengthening the time up to unmeshing, resides in broadening the discriminator characteristic (control curve, also called S curve) formed from two correlation signals with the aid of additional correlators. Thus, a fine synchronization method has been known from DE 3,743,731, for example, with a broadened discriminator curve. For this purpose, many phase-shifted code signals are generated, all of which are correlated with the incoming data signal. By suitable weighting, a curve having an enlarged linear zone is produced from the resulting correlation curves. On account of the additional correlators, however, the influence of channel noise increases in the synchronization circuit while the useful signal contributions remain the same. Furthermore, the expenditure for realization is likewise higher.

REPRESENTATION OF THE INVENTION

It is an object of the invention to indicate a process of the type discussed hereinabove permitting an improved synchronization behavior, especially tracking within a large control region.

According to the invention, this object has been achieved in that, with a time drift of the data signal in the forward and, respectively, backward direction, a control range defined by the leading and by the trailing PN-code signal is adaptively shifted by shifting the trailing and, respectively, the leading PN-code signal by a predetermined time interval to the foremost and, respectively, rearmost location and, with a new assignment of the PN-code sequences, the data signal is, for the purpose of data modulation, correlated with the now chronologically central PN-code signal.

The core of a PN-code tracking loop according to this invention resides in that, with increasing synchronization error (drift), individual correlation branches are switched over, i.e. are shifted to another code position. Thereby, a periodic and fragmentally linear discriminator curve is created. The advantage over the classical control circuits (e.g. DLL) resides in that a narrow-band control circuit with a loop filter of low order can effect follow-up control, in principle, of rapid dynamic processes by switchover of individual correlation branches. In contrast thereto, a narrow-band classical tracking loop with the same loop filter would not be able to follow a rapidly changing input signal and would unmesh. In contrast to the control circuits known from the state of the art with a broadened discriminator curve, no additional correlators are required in the invention. An important aspect resides furthermore in that, with the switchover of the code in the correlation branches, also the path for the data demodulation is correspondingly newly forged.

In accordance with a preferred embodiment of the invention, exactly three PN-code signals, shifted by respectively delta $T_c$, are generated. During the adaptive shifting of the control range, the earlier and, respectively, later PN-code signal is shifted by 3 delta $T_c$ to the foremost and, respectively, rearmost location. Therefore, with only three correlators, a control range can be covered which, in principle, is of any desired breadth.

The factor delta can be chosen to be differently large. Especially preferred values are delta = 0.5 and delta = 1.

The switchover criterion is advantageously selected so that in all cases a switching hysteresis is produced. Thereby an all too frequent switchover is avoided. Advantageously, care is also taken that the power of the correlation signal in the data path (i.e. in the path utilized for data demodulation) does not fall below a certain percentage value (based on the maximally possible correlation power).

Shifting of the control range can take place advantageously always when the power of the correlation signal in the correlation path is lower than in one of the control paths. Thus, in all cases the correlation signal of greatest power is exploited for the data demodulation.

In an especially preferred embodiment, shifting of the control range takes place always when the power of the correlation signal in the correlation path is lower than half of that of a control path. Thereby, the advantageous switching hysteresis can be attained in a simple way.

A synchronizing circuit according to this invention comprises a controllable timer (e.g. a VCO = voltage controlled oscillator), a PN-code generator with at least three outputs for producing at least three PN-code signals mutually shifted in phase, a signal path for each output of the PN-code generator with a correlator for correlating the spread data signal with respectively one of the PN-code signals, and a control signal circuit to provide follow-up for the timer. A characterizing aspect for such a synchronizing circuit is a switching matrix which latter can selectively connect two adaptively fixable signal paths to the control circuit and one signal path to a data modulating circuit. The PN-code generator is designed so that the phase position of each PN-code signal transmitted at the outputs can be shifted in phase by predetermined intervals. This can be realized, for example, with controllable or, respectively, programmable delay members.

The process according to this invention is especially suited for the synchronization of mobile radio receivers. In the latter, the received signal is shifted with respect to the transmitter in dependence on the relative velocity.

Additional preferred feature combinations of the invention can be derived from the entirety of the claims and the following detailed description.

BRIEF DESCRIPTION OF THE DRAWINGS

The invention will be described in greater detail below with reference to embodiments and in conjunction with the drawings wherein.

WAYS OF EXECUTING THE INVENTION

Figure 1:
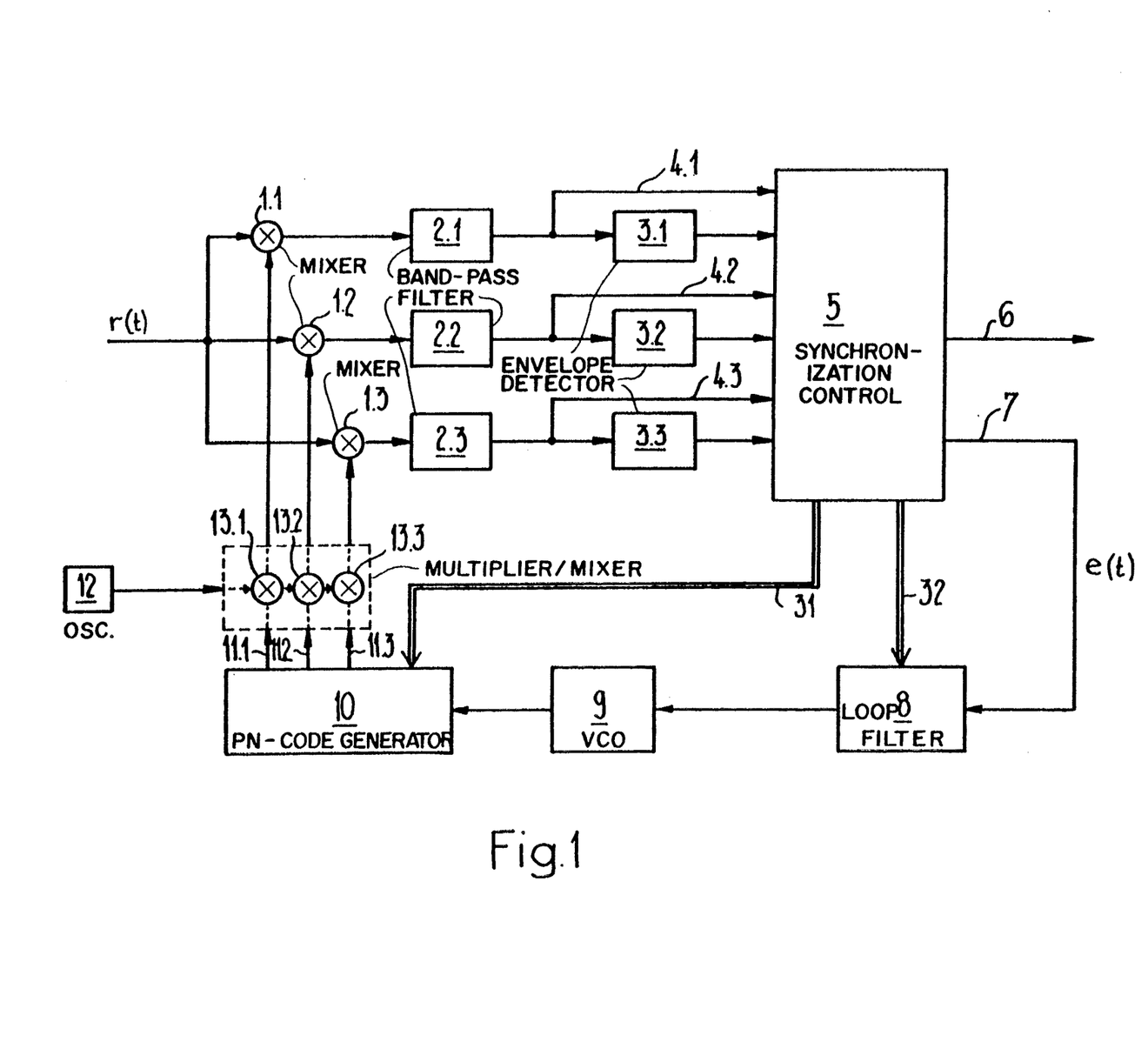
FIG. 1 is a block circuit diagram of a synchronizing circuit according to this invention.

As can be seen from FIG. 1, a received signal r(t) is distributed to three correlation paths which are essentially identical in circuitry. In a mixer 1.1, 1.2 and 1.3, respectively, the received signal r(t) is correlated with a PN-code signal of defined phase position. In a subsequent band-pass filter 2.1, 2.2 and 2.3, respectively, the output signal of the mixer 1.1, 1.2 and 1.3, respectively, is conventionally filtered and then fed, on the one hand, via a line 4.1, 4.2 and 4.3, respectively, directly to a synchronization control 5 and, on the other hand, to an envelope detector 3.1, 3.2 and 3.3, respectively. The envelope detectors 3.1, 3.2, 3.3 form, for example, the absolute amount of the input signal or the square of the amplitude. The data-neutral correlation signals produced with the envelope detectors 3.1, 3.2, 3.3 are likewise fed to the synchronization control 5.

The synchronization control 5 represents the core of the switching arrangement according to this invention. This control transmits, at an output 6, a signal (from which the spread has been eliminated) for data demodulation, from which the transmitted data are extracted by means of a demodulating circuit (not shown). At an output 7, an error signal e(t) is transmitted which is fed to a VCO 9 via a loop filter 8. This VCO represents the timer for a PN-code generator 10 which latter, according to the invention, can produce at three outputs 11.1, 11.2, 11.3 PN-code signals identical except for the phase position. The phase position of each PN-code signal can be varied within a predetermined time grid. The time grid is defined by a time difference delta $T_c$.

The synchronization control 5 furthermore dictates to the loop filter 8 the initial conditions of importance during the switchover as described below. Finally, this control unit transmits to the PN-code generator 10 the code positions and, respectively, phase positions for the PN signals.

The drawing includes a supplement to the circuit required for a heterodyne revertive spreading that may be necessary. This circuit involves a local oscillator 12 and respectively one multiplier/mixer 13.1, 13.2, 13.3 for the PN-code signals transmitted at the outputs 11.1, 11.2, 11.3.

The mode of operation of the synchronization control 5 will be explained with reference to FIGS. 2a–e. It is assumed here that three PN-code signals, shifted by respectively delta $T_c$ in time with respect to one another, are transmitted at the outputs 11.1, 11.2, 11.3. The PN-code signal in the middle (with respect to phase) which is transmitted, for example, at the output 11.2 and is correlated in mixer 1.2 with the received signal r(t) is made to track the received signal r(t) as well as possible by means of the synchronizing circuit, especially the controllable timer (VCO 9).

Figure 2:
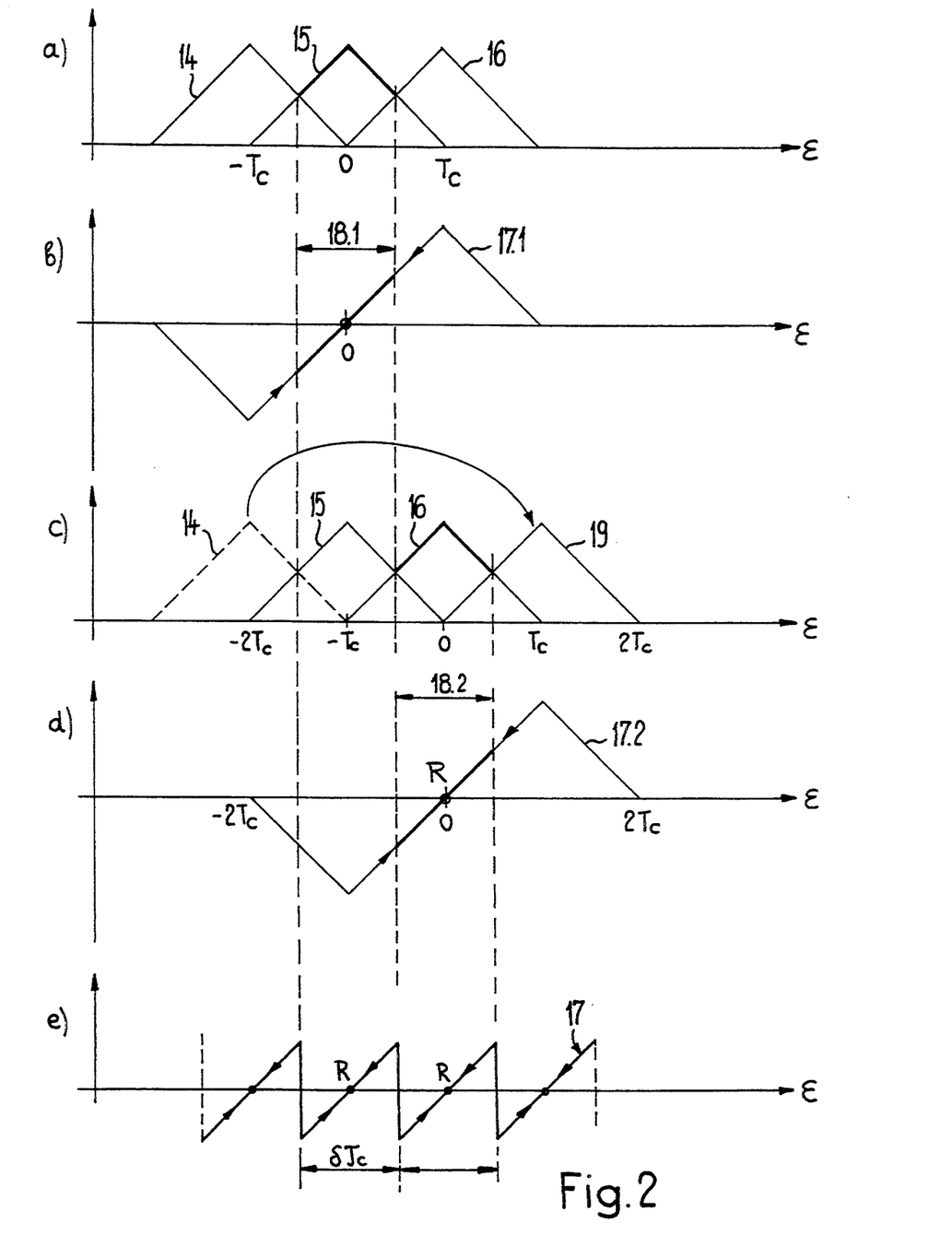
FIGS. 2a–e show an illustration, in principle, of the correlation curves and characteristic discriminator curves during the shifting of the control range according to this invention.
Figure 3:
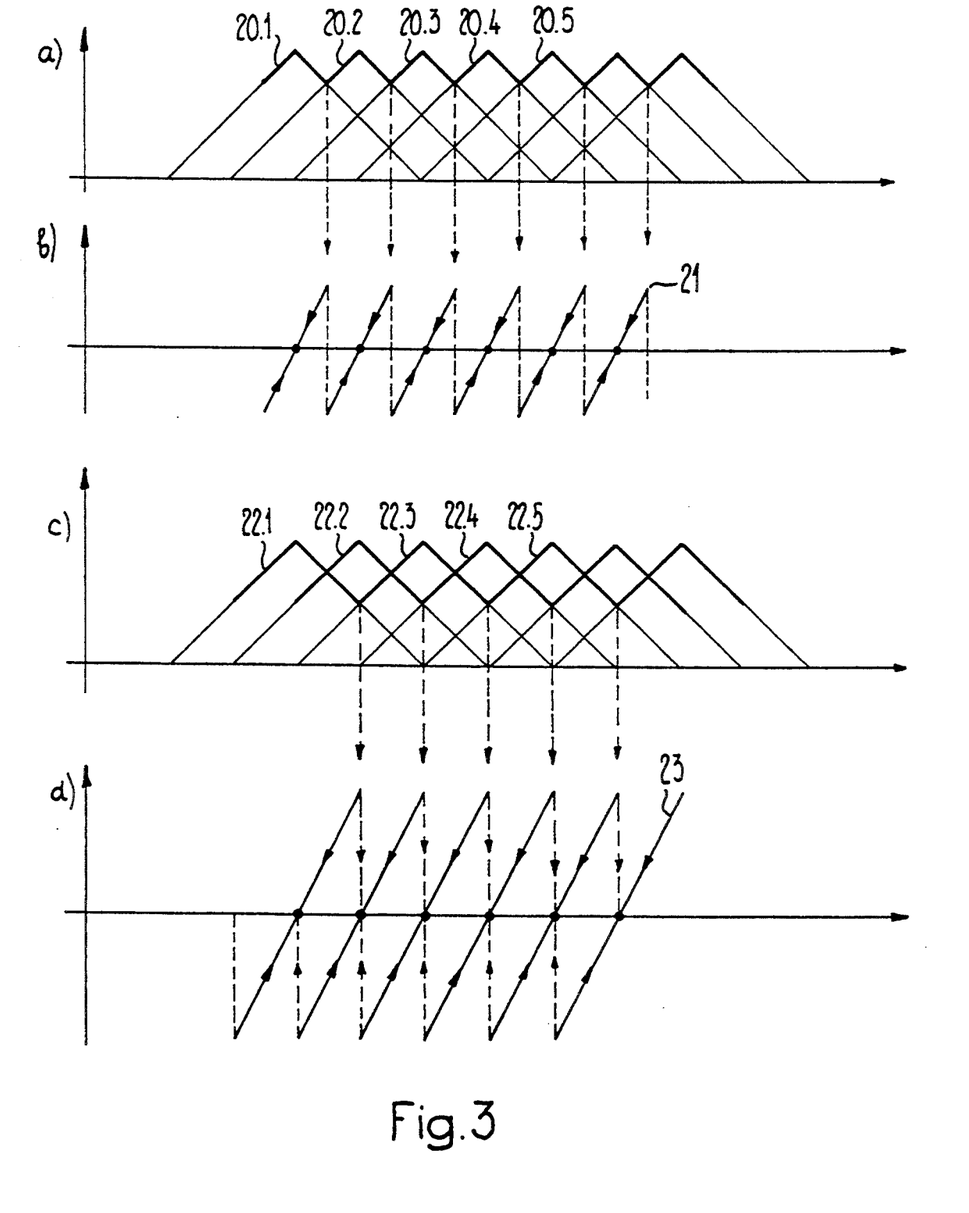
FIGS. 3a–d show the correlation curves and the characteristic discriminator curve for two different switchover criteria.

It is assumed, for the explanations below, that there are transmitted, at output 11.1, the PN-code signal shifted forward in time by delta $T_c$ (in FIG. 2, delta was chosen to equal 1), i.e. the earlier signal, and, at the output 11.3, the PN-code signal trailing by delta $T_c$, i.e. the later signal. Thus, in the three correlation paths, three correlation curves are produced, namely 14 (corresponding to the leading signal), 15 (corresponding to the on-time signal), and 16 (corresponding to the trailing signal) in dependence on the phase shift of the received signal r(t) with respect to the PN-code signal in the middle with regard to phase, By subtracting the leading (early) correlation curve from the trailing (late) correlation curve, a characteristic curve 17.1 is obtained permitting, in principle, a control range having the width 2 ($T_c$ + delta $T_c$) (outside of this range, the curve 17.1 disappears). The error signal for providing tracking for the VCO 9 has an amplitude derived from the curve 17.1 in correspondence with the synchronizing error epsilon. The data demodulation is performed on the basis of the middle correlation curve 15. Under ordinary circumstances, i.e. when there is no drift of the phase position of the received signal, the synchronizing circuit of this invention operates according to the principle of a conventional DLL. However, in case the received signal is shifted in phase to such an extent that the power according to the correlation curve 15 is lower than in correlation curve 14 or 16, then the switchover is performed as described hereinbelow.

Assuming that the phase shift between the received signal and the PN-code signal central in time becomes increasingly larger (in the positive direction), the correlation signal in the correlation path in the middle with respect to phase (correlation curve 15) will become smaller starting with a specific phase difference dephi (herein dephi > delta $T_c/2$) than that in the trailing correlation path (correlation curve 16). According to the invention, the phase of the originally leading PN-code signal (correlation curve 14) is now altered so that it trails the precedingly trailing PN-code signal (correlation curve 16) by delta $T_c$ (correlation curve 19).

At the same time, a reassignment of the correlation paths is conducted along the lines that the data demodulation is performed on the basis of the presently middle (as regards the phase) correlation curve 16. In order to produce the error signal, the difference is utilized between the correlation curve 19 and the previously central correlation curve 15 (compare FIG. 2d). A comparison of the two FIGS. 2b and 2d shows that the characteristic curve 17.1 has been replaced by the curve 17.2, shifted in time. Control is now also executed on a different zero point (likewise shifted by delta $T_c$).

In a completely analogous fashion, a drift in the rearward direction can likewise be compensated for. By placing the control ranges 18.1, 18.2, etc. in series, the sawtooth-shaped curve 17 according to this invention, constant in fragments, is obtained as shown in FIG. 2e.

Since, when switching over one of the three PN-code signals and when reassigning the correlation paths there is a change not only in the relative synchronizing error (according to FIG. 2c from +delta $T_c/2$ to −delta $T_c/2$), but also in the value of the error signal, the value of the output signal of the loop filter 8 must be initialized in correspondence with the value in the new discriminator characteristic curve (by applying the initial conditions to the loop filter 8).

The entire switchover procedure as described above is performed by the synchronizing control 5. The latter tests the correlation values in the three paths, determines the necessary shifts of the individual PN-code signals, sets the initial conditions for the output signal of the loop filter 8, and changes the assignment between the correlation signals fed via the lines 4.1, 4.2, 4.3 and the output 6.

The principle of the invention has been described with reference to the case of delta = 1. However, advantageously smaller values are implemented for delta, for example delta = 0.5. FIGS. 3a–d illustrate two examples for delta = 0.5 with varying switchover criteria. As can be seen from FIG. 3, the individual correlation curves 20.1, .... 20.5 are spaced much more closely than in the example according to FIG. 2a. As the switchover criterion, the condition was chosen once again that the power (value of the correlation curve) in the leading and, respectively, trailing path is higher than in the central path. The resultant discriminator curve 21 differs from that shown in FIG. 2e merely by another periodicity. As compared with the above example, however, the power of the signal used for data demodulation is in all cases rather high. In principle, this power will never drop by more than one quarter of the maximum correlation power.

A switchover criterion leading to a hysteresis of the discriminator curve is especially preferred. One example for switchover with hysteresis can be seen from FIGS. 3c and d. In this example, switchover is effected whenever the power in the leading or trailing path is twice as high as in the central path. Based on the smaller spacing of the correlation curves 22.1, ... 22.5 (as compared with FIG. 2), the preferred hysteresis indicated by arrows is produced in the discriminator curve 23. It is to be noted that, in the ideal case, the phase error will disappear during switchover since the new "rest position" is congruent with the "threshold point" of the curve that has not as yet been switched over.

It can easily be seen that with delta = 0.5 any switchover criterion stronger than that used in FIGS. 3a, b will lead to a switching hysteresis. In other words: Whenever the requirement exists that the power in the leading or trailing path must be higher by a specific value than that in the central path, a hysteresis exists. The condition applies, though, that delta < 1.

FIGS. 2a–e and 3a–d show the correlation curves for the case of amount-forming envelope detectors 3.1, 3.2, 3.3. These curve configurations change, of course, if the amplitude is, for example, squared by the envelope detectors. The switchover conditions then must be adapted accordingly.

The hysteresis has the consequence that too rapid a switching in one and then in the other direction, which can be caused, for example, by interferences, is avoided.

Hystereses can be brought about with a great variety of means. Thus, it is possible, for example, to provide even more than three correlation paths whereby an improvement is obtained in the switchover by monitoring the signal power in the various correlation paths, and by switching through the path of maximum power to the data demodulation. With four or five parallel correlation paths, after all, there is not only one central path, and switchover or, respectively, shifting of the control range can be delayed for a longer period of time without the power in the demodulating path becoming too low. In case of five correlation paths, there are, for example, three central paths that can be selectively employed in correspondence with the criterion of maximum power for data demodulation. As long as the received signal does not enter the range of the earliest and, respectively, latest correlation signal, no phase shifts are required.

Figure 4:
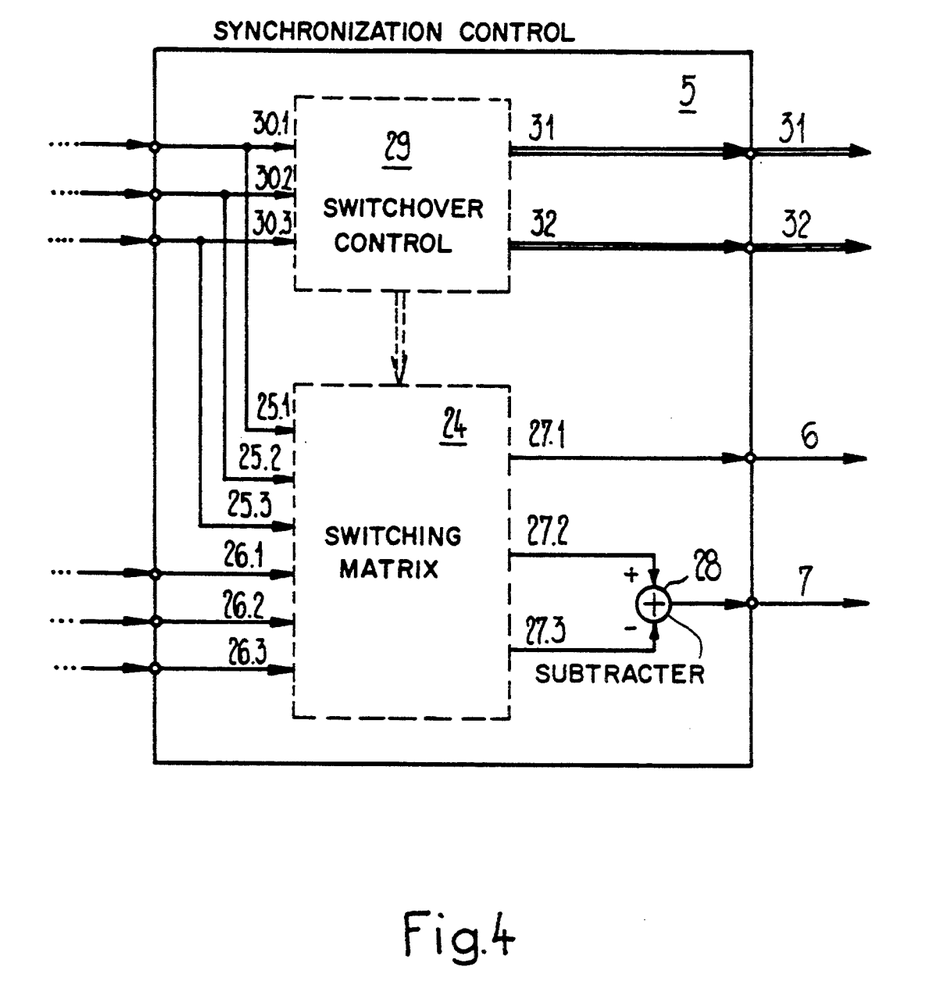
FIG. 4 is a block circuit diagram for a testing and switchover logic circuit based on a DLL.

FIG. 4 shows a block circuit diagram of the synchronization control 5. A switching matrix 24 is designed so that, in correspondence with control signals of the switchover control 29, selectively one of the data-containing signals present at inputs 26.1, 26.2, 26.3 can be applied to the output 27.1 for the purpose of data demodulation. The envelopes of the signals are transmitted to the switchover control 29 at inputs 30.1, 30.2, 30.3. This control unit performs the tests described with reference to FIGS. 2a–e and 3a–d and determines the reassignment of the correlation paths, the initial conditions for the loop filter 8 (output 32), and the code position or phase position for the PN-code generator 10 (output 31).

The switching matrix 24 also has inputs 25.1, 25.2, 25.3 for the data-neutral output signals of the envelope detectors 3.1, 3.2, 3.3 (compare FIG. 1). Two of these three inputs are applied to the outputs 27.2 and 27.3 in correspondence with the control signals of the switchover control 29. A subtracter 28 forms the difference and transmits the latter as an error signal (input signal of the loop filter 8).

Figure 5:
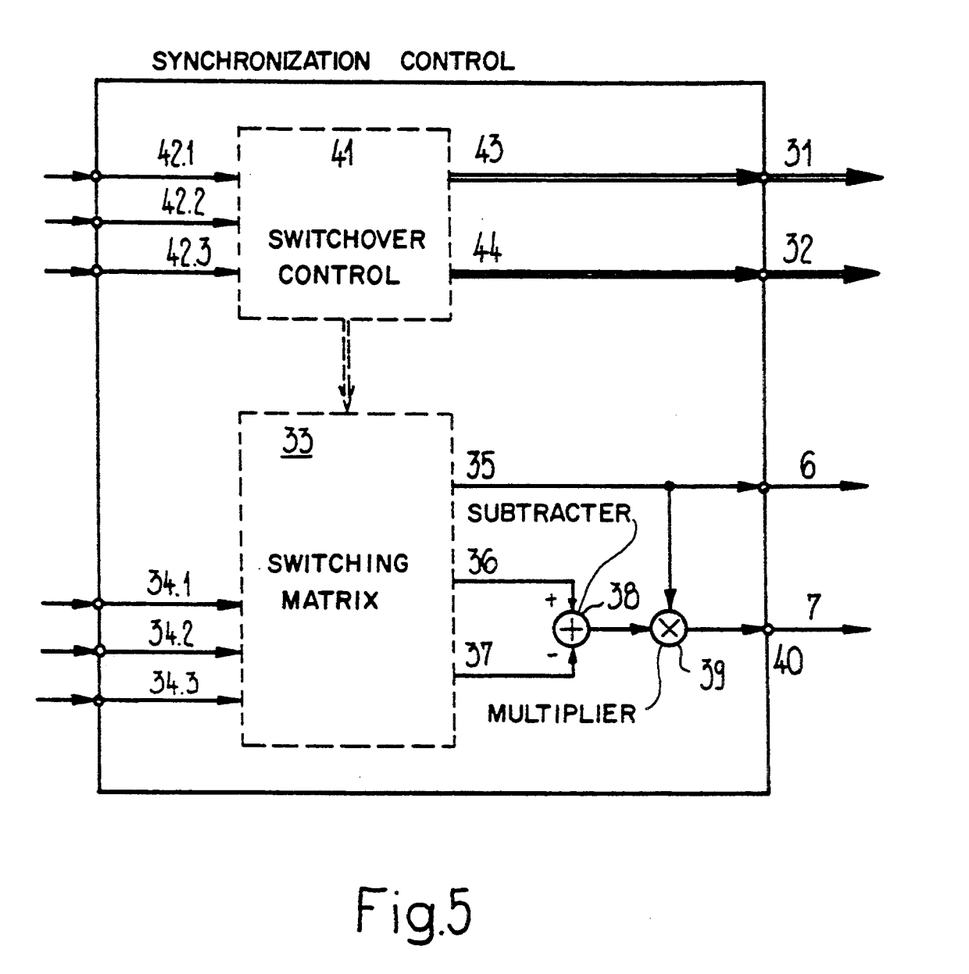
FIG. 5 is a block circuit diagram for a testing and switchover logic circuit for a synchronizing circuit based on the principle of the MCTL.

FIG. 5, finally, shows a block circuit diagram of a synchronization control for a synchronization according to the MCTL principle (modified-code tracking loop). The data-carrying correlation signals (compare lines 4.1, 4.2, 4.3 in FIG. 1) are applied to the inputs 34.1, 34.2, 34.3 of a switching matrix 33. The aforementioned input signals are applied selectively to the outputs 35, 36, 37 in correspondence with the signals of a switchover control unit 41. The output 35 is utilized for the data demodulation. The outputs 36 and 37 are subtracted from each other in a subtracter 38. The resultant difference is multiplied in a multiplier 39 with the signal transmitted at the output 35. From this results the error signal at an output 40; this signal is transmitted to a VCO by way of a loop filter.

The output signals of the envelope detectors are applied to the inputs 42.1, 42.2, 42.3 of the switchover control unit 41. On the other side, at outputs 43 and 44, code positions (for the PN-code generator) and, respectively, initial conditions (for the loop filter) are transmitted.

The invention, by the way, is also usable in conjunction with further conventional control structures. Such a structure is, for example, the conventional Tau dither loop. In a similar manner as in case of the DLL, a periodic discriminator curve is produced by the invention in the Tau dither loop. The same applies also to the so-called double dither loop.

It is thus possible by means of the novel PN-code tracking loop according to this invention to generate a periodic discriminator curve with three mutually shifted and adaptively switchable correlation paths. Consequently, it is possible to be able to monitor rapid dynamic processes with a narrow-band control circuit by means of a loop filter of a low order. The circuit concept according to this invention can also be utilized for coarse synchronization and leads to a substantial acceleration. Since all three correlation branches are of identical structure, and power measurement is possible in all three branches, coarse synchronization can be performed approximately three times faster than with the use of a synchronizing circuit wherein only one correlation path is available for power measurement.

We claim:

1. A process for synchronizing a receiver switching circuit to a received signal containing a PN-code-spread data signal, comprising the steps of
   a) generating first, second and third PN-code signals shifted in time with respect to one another and controlling said PN-code signals by a controllable timer,
   b) correlating said second PN-code signal, which is located intermediately with respect to time, in a second correlation path with the received signal for the purpose of data demodulation,
   c) correlating said first PN-code signal, which is leading in time, in a first correlation path with the received signal and correlating said third PN-code signal, which is trailing in time, in a third correlation path with the received signal for the purpose of controlling the timer,
   d) comparing a power of the correlated PN-code signals in said second correlation path with a power in said first and third correlation paths, respectively,
   e) adaptively shifting a control range, which is defined by the position in time of the leading and the trailing PN-code signals, when the power in the second correlation path is lower than in the first or third correlation paths, wherein,
   f) in case of the power in the second correlation path being lower than in the first correlation path—which indicates a time drift of the data signal in the forward direction-shifting the trailing PN-code signal by a predetermined time interval to a foremost location in time with respect to the remaining two PN-code signals, and
   g) reassigning the PN-code signals to the correlation paths, wherein said first PN-code signal, which is now located intermediately with respect to time, is correlated in the second correlation path with the received signal for the purpose of data demodulation, and said second PN-code signal, which is now trailing in time, is correlated in the third correlation path with the received signal, and said third PN-code signal, which is now leading in time, is correlated in the first correlation path with the received signal for the purpose of controlling the timer,
   h) in case of the power in the second correlation path being lower than in the third correlation path—which indicates a time drift of the data signal in the rearward direction-shifting the leading PN-code signal by a predetermined time interval to a rearmost location in time with respect to the remaining two PN-code signals, and
   i) reassigning the PN-code signals to the correlation paths, wherein said third PN-code signal, which is now located intermediately with respect to time, is correlated in the second correlation path with the received signal for the purpose of data demodulation, and said first PN-code signal, which is now trailing in time, is correlated in the third correlation path with the received signal, and said second PN-code signal, which is now leading in time, is correlated in the first correlation path with the received signal for the purpose of controlling the timer.

2. A process according to claim 1, in which exactly three PN-code signals are produced, the PN-code signals being shifted by delta*$T_C$ with respect to each other, wherein delta is a factor and $T_C$ a duration of one code chip of the PN-code signal, and wherein, during the adaptive shifting of the control range, shifting the leading PN-code signal by 3*delta*$T_C$ to the rearmost location in case of a time drift of the data signal in the forward direction, and, in the case of a time drift of the data signal in the rearward direction, shifting the leading PN-code signal by 3*delta*$T_C$ to the rearmost location.

3. A process according to claim 2, in which delta is equal to 0.5.

4. A process according to claim 2, in which delta is equal to 1.0.

5. Process according to claim 1 in which shifting of the control range is performed whenever the power in the second correlation path is lower than the power in one of the first or third correlation paths.

6. Process according to claim 1, in which shifting of the control range is performed whenever the power of the second correlation path is lower than half of that in one of the first or third correlation paths.

7. A synchronizing circuit, comprising
   a) a controllable timer,
   b) means for generating first, second and third PN-code signals shifted in time with respect to one another, said means being connected for control by said controllable timer,
   c) means for correlating said second PN-code signal, which is located intermediately with respect to time, in a second correlation path with a received signal for the purpose of data demodulation,
   d) means for correlating said first PN-code signal, which is leading in time, in a first correlation path with the received signal, and means for correlating said third PN-code signal, which is trailing in time, in a third correlation path with the received signal for the purpose of controlling said timer, e) switchover control means for comparing a power of the correlated PN-code signals in said second correlation path with a power in said first and third correlation paths, respectively, f) switching matrix means for adaptively shifting a control range, which is defined by the position in time of the leading and the trailing PN-code signals, when the power in the second correlation path is lower than in the first or third correlation paths, wherein, g) the switchover control means interacts with the PN-code generating means to the effect that, in case of the power in the second correlation path being lower than in the first correlation path—which indicates a time drift of the data signal in the forward direction—the trailing PN-code signal is shifted by a predetermined time interval to a foremost location in time with respect to the remaining two PN-code signals, and h) wherein the switchover control means interacts with the switching matrix means for reassigning the PN-code signals to the correlation paths, wherein said first PN-code signal, which is now located intermediately with respect to time, is correlated in the second correlation path with the received signal for the purpose of date demodulation, and said second PN-code signal, which is now trailing in time, is correlated in the third correlation path with the received signal, and said third PN-code signal, which is now leading in time, is correlated in the first correlation path with the received signal for the purpose of controlling said timer, i) and wherein the switchover control means interacts with the PN-code generating means to the effect that, in case of the power in the second correlation path being lower than in the third correlation path—which corresponds to a time drift of the data signal in the rearward direction—the leading PN-code signal is shifted by a predetermined time interval to a rearmost location in time with respect to the remaining two PN-code signals, and j) wherein the switchover control means interacts with the switching matrix means for reassigning the PN-code signals to the correlation paths, wherein said third PN-code signal, which is now located intermediately with respect to time, is correlated in the second correlation path with the received signal for the purpose of data demodulation, and said first PN-code signal, which is now trailing in time, is correlated in the third correlation path, and said second PN-code signal which is now leading in time is correlated in the first correlation path with the received signal for the purpose of controlling said timer.

8. A receiver for receiving band-spread communication signals, comprising a synchronizing circuit having,
a) a controllable timer,
b) means for generating first, second and third PN-code signals shifted in time with respect to one another, said means being connected for control by said controllable timer,
c) means for correlating said second PN-code signal, which is located intermediately with respect to time, in a second correlation path with a received signal for the purpose of data demodulation,
d) means for correlating said first PN-code signal, which is leading in time, in a first correlation path with the received signal, and means for correlating said third PN-code signal, which is trailing in time, in a third correlation path with the received signal for the purpose of controlling said timer,
e) switchover control means for comparing a power of the correlated PN-code signals in said second correlation path with a power in said first and third correlation paths, respectively,
f) switching matrix means for adaptively shifting a control range, which is defined by the position in time of the leading and the trailing PN-code signals, when the power in the second correlation path is lower than in the first or third correlation paths, wherein,
g) the switchover control means interacts with the PN-code generating means to the effect that, in case of the power in the second correlation path being lower than in the first correlation path—which indicates a time drift of the data signal in the forward direction—the trailing PN-code signal is shifted by a predetermined time interval to a foremost location in time with respect to the remaining two PN-code signals, and
h) wherein the switchover control means interacts with the switching matrix means for reassigning the PN-code signals to the correlation paths, wherein said first PN-code signal, which is now located intermediately with respect to time, is correlated in the second correlation path with the received signal for the purpose of date demodulation, and said second PN-code signal, which is now trailing in time, is correlated in the third correlation path with the received signal, and said third PN-code signal, which is now leading in time, is correlated in the first correlation path with the received signal for the purpose of controlling said timer,
i) and wherein the switchover control means interacts with the PN-code generating means to the effect that, in case of the power in the second correlation path being lower than in the third correlation path—which corresponds to a time drift of the data signal in the rearward direction—the leading PN-code signal is shifted by a predetermined time interval to a rearmost location in time with respect to the remaining two PN-code signals, and
j) wherein the switchover control means interacts with the switching matrix means for reassigning the PN-code signals to the correlation paths, wherein said third PN-code signal, which is now located intermediately with respect to time, is correlated in the second correlation path with the received signal for the purpose of data demodulation, and said first PN-code signal, which is now trailing in time, is correlated in the third correlation path, and said second PN-code signal which is now leading in time is correlated in the first correlation path with the received signal for the purpose of controlling said timer.

* * * * *